United States Patent
Yehezkieli et al.

Patent Number: 5,609,434
Date of Patent: Mar. 11, 1997

[54] SURFACE CONNECTOR

[75] Inventors: Oded Yehezkieli, Kiryat Tivon; Israel Kehaty, Karmiel, both of Israel

[73] Assignee: State of Israel, Ministry of Defence, The Rafael Armament Development Authority, Tel-Aviv, Israel

[21] Appl. No.: 672,241

[22] Filed: Jun. 28, 1996

Related U.S. Application Data

[63] Continuation of Ser. No. 601,649, Feb. 14, 1996, abandoned, which is a continuation of Ser. No. 267,770, Jul. 6, 1994, abandoned.

[30] Foreign Application Priority Data

Jul. 7, 1993 [IL] Israel .................................. 106286

[51] Int. Cl.⁶ .......................................... F16B 9/00
[52] U.S. Cl. ......................... 403/260; 403/256; 411/339; 411/383
[58] Field of Search ................... 403/254, 256, 403/258, 260, 374, 379; 411/338, 339, 383, 384; 242/597.4, 608.4, 609.2

[56] References Cited

U.S. PATENT DOCUMENTS

| | | | |
|---|---|---|---|
| 1,150,114 | 8/1915 | Hays | 411/338 X |
| 1,339,357 | 5/1920 | Kopriva | 403/374 X |
| 2,516,537 | 7/1950 | Wetzel et al. | 403/374 X |
| 2,549,086 | 4/1951 | Harrer | 403/379 |
| 2,700,172 | 1/1955 | Rohe | 16/2 |
| 2,957,196 | 10/1960 | Kreider et al. | 16/2 |
| 3,258,283 | 6/1966 | Winberg et al. | 403/379 |
| 3,771,410 | 11/1973 | Swindt, II | 411/338 |
| 3,851,982 | 12/1974 | See | 403/379 X |
| 5,004,361 | 4/1991 | Winnie | 411/366 |
| 5,205,667 | 4/1993 | Montgomery, Sr. | 411/338 X |
| 5,452,529 | 9/1995 | Neuenfeldt et al. | 403/374 X |

FOREIGN PATENT DOCUMENTS

| | | | |
|---|---|---|---|
| 2621362 | 4/1989 | France. | |
| 820277 | 11/1951 | Germany | 403/260 |

Primary Examiner—Blair Johnson
Assistant Examiner—Andrea Chop
Attorney, Agent, or Firm—Nikaido Marmelstein Murray & Oram LLP

[57] ABSTRACT

A rigid assembly of at least two intersecting constituent members which form between them at least one engagement canal made of two opposite holes in two brackets of one constituent member, each with an inwardly converging wall, and a registering transversal bore with divergent end portions in the other constituent member. A tightening device is accommodated within each engagement canal which comprises a first cylindrical member with a centrally bored frusto-conical head portion, a second cylindrical member slidably accommodated therein and having a screw-threaded central bore and a frusto-conical head portion, and a tightening screw connecting both cylindrical members, each of said frusto-conical head portions being of smaller size than the associated bracket hole and having a slant matching that of the side wall of the latter. When the tightening screw is tightened, the first and second cylindrical members of the tightening device are drawn together and the constituent members are fastened to each other.

5 Claims, 3 Drawing Sheets

SURFACE CONNECTOR

This application is a continuation of application of Ser. No. 08/601,649 filed on Feb. 14, 1996, now abandoned, which is a continuation application of Ser. No. 08/267,770 filed Jul. 6, 1994, now abandoned.

FIELD OF THE INVENTION

The present invention concerns an assembly comprising two constituent members rigidly locked together in such a way that the planes of contact between the two members intersect. For convenience such an assembly will be referred to hereinafter as "intersecting rigid assembly".

BACKGROUND OF THE INVENTION

Intersecting rigid assemblies are required for the transmission of forces from one constituent member to the other, typical examples being a turbine in which a plurality of blades are mounted on a rotor; missiles or rockets in which guiding fins or rudders are mounted on a tail portion; and there are many others. In accordance with the prior art, the interlocking engagement of two constituent members of an intersecting rigid assembly is brought about by providing on the first constituent member an engagement portion with a plurality of transversal bores, providing on the second constituent member an integral pair of brackets with a plurality of pairs of registering holes, inserting the engagement portion of the first constituent member between a pair of brackets of the second constituent member so that each bore of the former is in alignment with a pair of registering holes of the latter, and tightening the two constituent members together by means of tightening members such as screws, bolts or rivets. In such prior art intersecting rigid assemblies, the tightening forces holding the two constituent members together are oriented predominantly in the direction of the tightening members. Accordingly, in order to provide the necessary resistance to the forces acting on the assembly, a relatively large number of tightening members is required which renders the assembling operation quite onerous.

SUMMARY OF THE INVENTION

It is the object of the present invention to provide an improved intersecting rigid assembly of the kind specified and also to provide tightening means for use in such an assembly.

The invention is based on a novel concept for making an intersecting rigid assembly of the kind specified, by which mutually normal tightening forces are provided for holding the first and second constituent members together, and it has been found in accordance with the invention that in this way it is possible to achieve a superior interlock in terms of resistance to external forces, with less tightening members.

In accordance with the present invention there is provided an intersecting rigid assembly of at least one first constituent member and one second constituent member of the kind in which a flat engagement portion of the at least one first constituent member having at least one transversal bore is held between two brackets of the second constituent member, which brackets are of suitable height, enclose between them a bracket base and have at least one pair of registering bracket holes forming together with an aligned transversal bore of the flat engagement portion a tightening canal that accommodates tightening means, characterized by:

(i) the flat engagement portion having a lower edge matching the bracket base and two shoulders removed from the lower edge by a distance corresponding to the height of the brackets;

(ii) each bracket hole having a slanted, inwardly convergent peripheral wall and each transversal bore having divergent end portions;

(iii) a tightening device accommodated within each of the tightening canals and comprising a first cylindrical member with a centrally bored frusto-conical head portion, a second cylindrical member slidably accommodated therein and having a screw-threaded central bore and a frusto-conical head portion, and a tightening screw connecting both cylindrical members, each of the frusto-conical head portions being of smaller size than the associated bracket hole and having a slant matching that of the side wall of the latter;

whereby when the tightening screw is tightened the the first and second cylindrical members are drawn together so that the shoulders and lower edge of the flat engagement portion of the at least one first constituent member come to bear tightly on, respectively, the upper edges and bracket base of the second constituent member.

For assembling an intersecting rigid assembly according to the invention, the flat engagement portion of a first constituent member is placed between two brackets of the second constituent member and properly positioned therein so that the holes of the brackets and flat engagement portion are aligned. A tightening device is then placed inside each tightening canal by inserting each of the two cylindrical members thereof at the two opposite ends of the canal until they engage within the canal. Due to the fact that each frusto-conical head portion of a cylindrical member of the tightening device is smaller than the associated slanting bracket hole, the initial engagement is loose. Because of this, and due to the divergent end portions of the transversal bore of the flat engagement portion, the latter is held in a position in which the shoulders and the lower edge are clear of, respectively, the upper edges and base of the associated bracket, with the result that the axes of the transversal bore and the bracket holes do not overlap. In that position the tightening screw is inserted across the hole in the head portion of the first cylindrical member and is screwed into the screw threaded central bore of the second cylindrical member whereby the two cylindrical members are drawn together as the screw is tightened. As the tightening proceeds, there occur interactions between the frusto-conical head portions of the two cylindrical members and the divergent end portions of the transversal bore and part of the slanting side walls of the bracket holes, as a result of which the engagement portion of the first constituent member is forced down until the shoulders and lower edge thereof come to bear tightly on, respectively, the upper bracket edges and the bracket base.

Depending on the nature and designated function, an intersecting rigid assembly according to the invention may comprise one single tightening canal accommodating one single tightening device, or alternatively two or more such canals and devices.

In accordance with the invention, one single first constituent member or alternatively a plurality of such members may be associated with one single second constituent member.

The invention further provides for use in an intersecting rigid assembly of the kind specified, a tightening device comprising a first cylindrical member with a centrally bored frusto-conical head portion, a second cylindrical member with a frusto-conical head portion and a central screw threaded bore, and a tightening screw for connecting and tightening the two members together.

DESCRIPTION OF THE DRAWINGS

For better understanding, the invention will now be described, by way of example only, with reference to the accompanying drawings in which.

DETAILED DESCRIPTION OF A SPECIFIC EMBODIMENT

Figure 1:
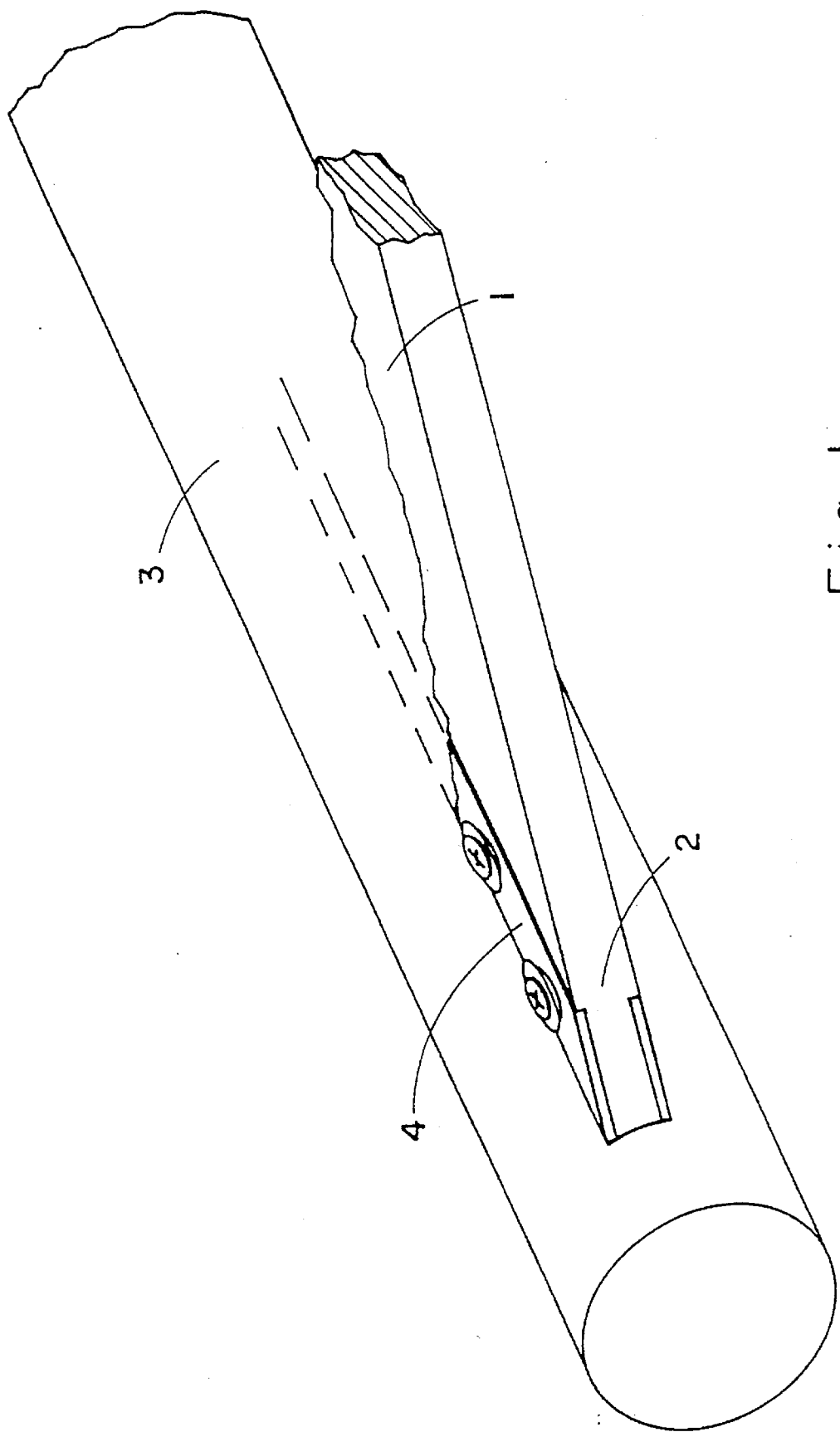
FIG. 1 is a perspective view of an intersecting rigid assembly according to the invention.

As shown in the drawings, an intersecting rigid assembly according to the invention comprises a first constituent member 1 with a flat engagement portion 2, and a second constituent member 3 with a pair of brackets 4 and 5 enclosing between them a bracket base 6 and having upper edges 7 and 8, respectively.

FIG. 1 shows only one single first constituent member 1 in association with the second constituent member 3. However, if desired, there may be several first constituent members 1 each forming an intersecting rigid assembly with the same second constituent member 3.

Brackets 4 and 5 have pairs of registering holes 9 and 10 each with a slanting, inwardly convergent peripheral wall. A transversal bore 11 in the flat engagement portion 2 is aligned with holes 9 and 10 forming with them a tightening canal with bevels 12 and 13.

The tightening device of the intersecting rigid assembly here shown comprises a first cylindrical member 15 with a frusto-conical head portion 16 having a central bore 17, and a second cylindrical member 18 having a frusto-conical head portion 19 and a screw-threaded axial bore 20. The device further comprises a tightening screw 21 fitting into the screw-threaded bore 20 and having a screw head 22 fitting into bore 17. As shown, bores 17 and 20 of, respectively, the first and second cylindrical members 15 and 18 are aligned.

Figure 2:
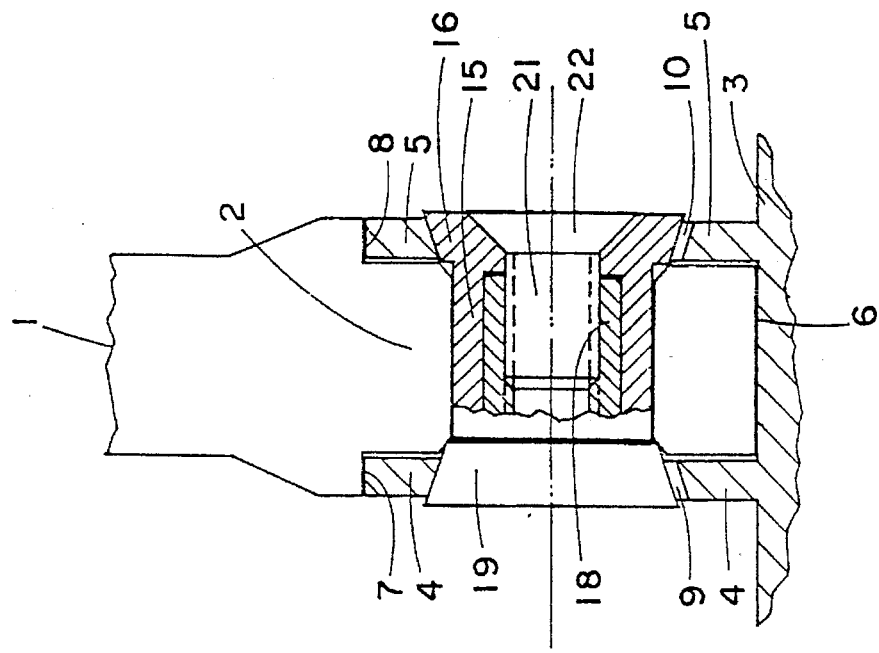
FIG. 2 shows a detail, partly in a section of the assembly of FIG. 1 in an initial assembling stage.
Figure 3:
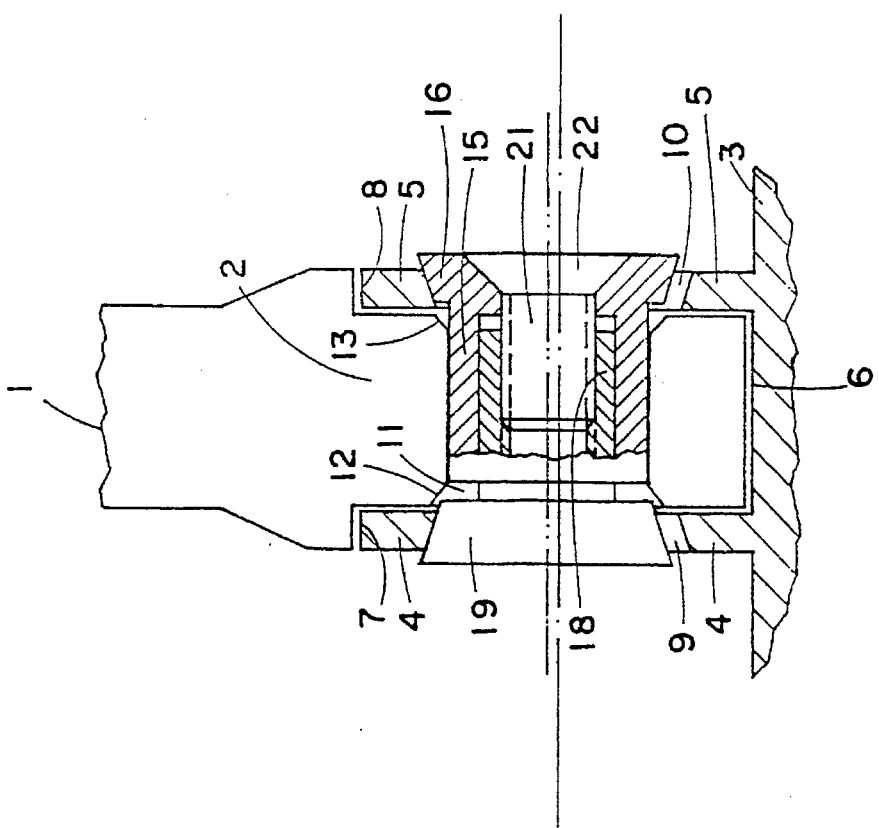
FIG. 3 is a similar view showing the assembly in the fully tightened stage.
Figure 4:
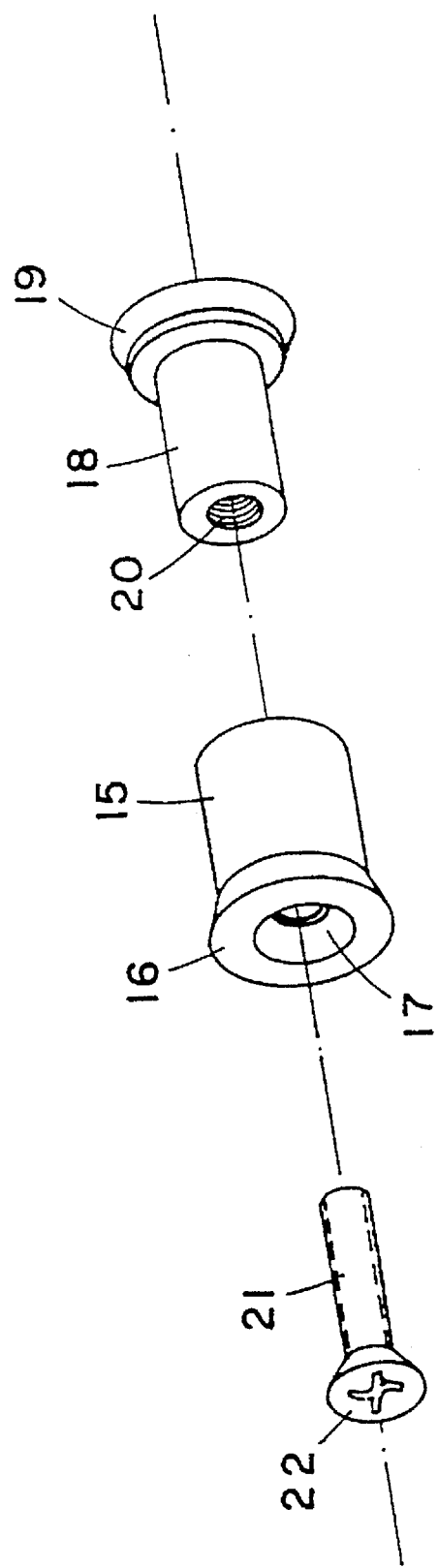
FIG. 4 is an exploded perspective view of tightening device forming part of the assembly of FIGS. 2 and 3.

For assembling the intersecting rigid assembly, the first constituent member 1 is so positioned that its flat engagement portion 2 is received between brackets 4 and 5 of the second constituent member 3 with each transversal bore 11 of the flat engagement portion 2 being in rough alignment with a pair of registering holes 9 and 10 of brackets 4 and 5 of the second engagement member 3. In the rough alignment, the central axes of holes 9 and 10 on the one hand and of the transversal bore 11 on the other hand are at first out of register, as shown in FIG. 2, which is due to the fact that bracket holes 9 and 10 are larger than the head portions 16 and 19 of the cylindrical members and also due to the divergent end portions of bore 11. As screw 21 is tightened, cylindrical members 15 and 18 are drawn together with the respective head portions 16 and 19 gradually sinking into the associated respective bracket holes 9 and 10. As the tightening proceeds, interaction of the frusto-conical head portions 16 and 19 with the convergent bracket holes 9 and 10 and transversal bore 11 results in a gradual depression of the first constituent member 1 until the shoulders of the flat engagement portion 2 come to bear tightly on the upper edges of the brackets 4 and 5 and simultaneously the lower edge of the flat engagement portion comes to bear tightly on bracket base 6 and the central axes of holes 9 and 10 on the one hand and of the transversal bore 11 on the other hand essentially coincide, as shown in FIG. 3. Due to bevels 12 and 13 the tightening operation proceeds smoothly without any interference from the edges of bore 11. When this position is reached, the tightening operation is complete and the tightening forces which provide the rigid interlock are both normal and parallel to the interfaces between the flat engagement portion 2 of the first constituent member and the brackets 4 and 5 of the second constituent member.

The intersecting rigid assembly according to the invention may comprise one or more tightening devices engaging a corresponding number of tightening canals.

We claim:

1. An intersecting rigid assembly comprising:
   at least one first constituent member and one second constituent member of a kind in which a flat engagement portion of said at least one first constituent member having at least one transverse bore is held between two brackets of said second constituent member, which brackets are of a suitable height for engaging said first constituent member, a bracket base extending between the brackets and the brackets have at least one pair of aligned bracket holes in register with the transverse bore of the flat engagement portion to form a tightening canal that accommodates a tightening device, wherein:
   (i) said flat engagement portion has a lower edge matching said bracket base and two shoulders spaced from said lower edge by a distance corresponding to a height of said brackets;
   (ii) each bracket hole has a slanted, inwardly convergent peripheral wall and each transverse bore having beveled edges;
   (iii) said tightening device is accommodated within said tightening canals, said tightening device includes a first cylindrical member which is axially bored therethrough and has a frusto-conical head portion and a constant diameter part extending from said frusto-conical head portion to an end thereof, a second cylindrical member slidably accommodated in the bore of the first cylindrical member and having a screw-threaded axial bore, a frusto-conical head portion and a constant diameter part extending from said frusto-conical head portion to an end of the second cylindrical member, the constant diameter part of the second cylindrical member being smaller in diameter than the constant diameter part of the first cylindrical member, and a tightening screw connecting both cylindrical members, each of said frusto-conical head portions being of smaller size than the associated bracket hole and having a slant matching that of the peripheral wall of the bracket hole;
   wherein when the tightening screw is tightened said first and second cylindrical members are drawn together causing their respective frusto-conical head portions to engage the respective bracket holes and therein urge the two shoulders and lower edge of the flat engagement portion of said at least one first constituent member to bear firmly against, respectively, upper edges of the two brackets and the bracket base of the second constituent member wherein mutually normal tightening forces are provided between the flat engagement member of the first constituent member and the brackets of the second constituent member.

2. An intersecting rigid assembly according to claim 1, comprising one single tightening canal accommodating a tightening device.

3. An intersecting rigid assembly according to claim 1, comprising at least two tightening canals each accommodating a tightening device.

4. An intersecting rigid assembly according to claim 1 wherein the beveled edges of the transverse bore have a diameter wider than a diameter of the bracket holes.

5. A tightening device comprising:

a first cylindrical member which is axially bored therethrough, and said first cylindrical member has a frusto-conical head portion and a constant diameter part extending from said frusto-conical head portion to an end thereof;

a second cylindrical member which is slidably located in the bore of the first cylindrical member, said second cylindrical member has a frusto-conical head portion, a constant diameter part extending from said frusto-conical head portion to an end of said second cylindrical member and a central screw-threaded bore, the constant diameter part of the second cylindrical member being smaller in diameter than the constant diameter part of the first cylindrical member; and a tightening screw, which passes through the bore in the first cylindrical member and is in engagement with the threaded bore, for connecting and for drawing the two members together.

\* \* \* \* \*